United States Patent Office 2,855,547
Patented Oct. 7, 1958

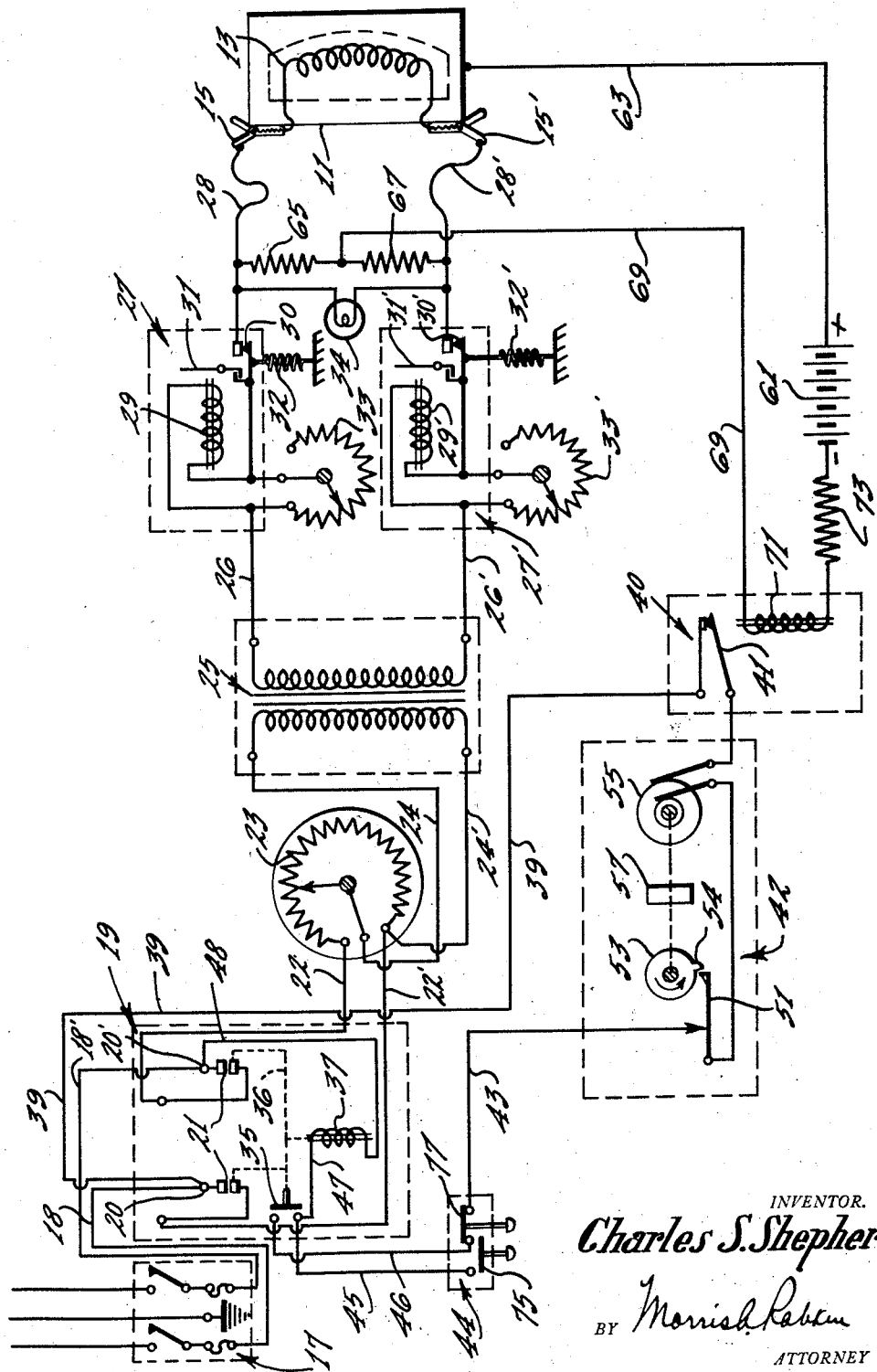

2,855,547

PROTECTIVE SYSTEM

Charles S. Shepherd, Findlay, Ohio, assignor to Radio Corporation of America, a corporation of Delaware Application March 31, 1954, Serial No. 420,070

The terminal 15 years of the term of the patent to be granted has been disclaimed 7 Claims. (Cl. 317—18)

This invention relates to protective electrical control circuits, and, more particularly, to an electric circuit for protecting valuable metal coil winding forms where the finished coil is subjected to the "thermo-fusion" process of bonding.

The production of metal coils of intricate shapes has been facilitated by the use of specially coated magnet wire, one form of which is known, in the trade, as Bondeze. This wire has a thermoplastic resin applied over the regular enamel insulation. This resin can be softened by heat and becomes quite tacky so that the individual turns of the coil will bond together when the source of heat is removed.

A convenient and economical method of bonding a coil is to heat it electrically while it remains on the winding form or arbor. This is accomplished by passing an electric current, through the wire, of magnitude sufficient to raise its temperature to a point where the resin coating will soften. Due to the low resistance of copper, which is used extensively for these coils, the magnitude of current required to heat it sufficiently for proper thermo-fusion is rather high, requiring in some cases a total of 2,000 watts at an impressed voltage of 100 to 110 volts.

A danger in this process lies in the fact that, in order to wind a coil of intricate shape, an expensive metal winding arbor is required which can be easily damaged during the thermo-fusion process if the coil is shorted or grounded to the arbor. A metal arbor has several advantages over one machined or molded from plastic. It is important that the arbor dissipate the heat generated in the coil as rapidly as possible and, since the arbors are expensive to manufacture, it is preferable that the arbor be made of a material which will wear well.

A deflection coil for a television picture tube is an example of the type of coil that may be wound on such an arbor. In winding such a coil at production rates, a coated magnet wire must be guided at high speed past deflecting wings into intricately shaped slots of the winding arbor. In so doing, it often happens that the insulation may be broken causing a turn to be grounded to the arbor. This may cause serious pitting of the arbor from an electric arc which may develop in the fusion process. Expensive arbors may quickly become worthless if this occurs too often. In some instances the coil may be wound with too few turns. In this event, when the fusion current is applied, the coil and arbor may become overheated due to the decreased resistance presented by the coil. In the case of shorted turns within the coil structure, not grounded to the arbor, the coil will again present decreased resistance to the fusion current resulting in overheating of the coil and possible resultant damage to the arbor. Fuses have been used in the fusion current circuit to protect the winding arbors. These have proved ineffective because by the time the fuse reacts to increased current to interrupt the circuit, the damage to the arbor has already been done.

An object of this invention is to provide a circuit for preventing damage to a coil winding arbor due to grounding between the coil and the arbor.

Another object of this invention is to provide a circuit for protecting a coil winding arbor against the damage due to overheating of the coil caused by insufficient turns on the coil or shorted turns within the coil.

A further object of this invention is to provide a protective circuit for a coil winding arbor which will prevent the flow of fusion current to the coil in response to any condition which represents a deviation, in the slightest degree, from a completely and correctly wound coil.

In accordance with the present invention a fusion current is applied to a coil, which is wound on a winding arbor, by means of a supply circuit which includes a control switch and circuit breakers connected in series with the coil. The control switch is closed by electromagnetic means in response to energization thereof. A control circuit is provided for energizing the electromagnetic means. This circuit includes the contacts of a sensitive relay. A safety circuit is provided to impress a potential difference between the coil and its winding arbor. The winding of the above mentioned sensitive relay is connected serially in the safety circuit. When the safety circuit is closed, due to a ground between the coil and the arbor, the relay opens the control circuit preventing the closing of the supply circuit. Hence damage to the arbor caused by arcing between the coil and the arbor due to the high fusion current is prevented. The circuit breakers interrupt the supply circuit when the current therein exceeds a preset value hence preventing damage due to overheating.

The novel features of the invention, as well as additional objects and advantages thereof, will be understood more fully from the following description when read in conjunction with the accompanying drawing in which the single figure illustrates, diagrammatically, one embodiment of a protective circuit according to the present invention.

Referring to the drawing in more detail, a winding arbor of any type is represented by the block 11 and has a coil 13 of a desired configuration wound thereon. The clips 15 and 15', by means of which coil 13 is connected to a fusion current supply circuit are mounted on the arbor 11 and insulated therefrom.

In the exemplified embodiment, the source of fusion current for the coil 13 is shown as a standard alternating current (A. C.) source line. This fusion current is supplied to the coil through a supply circuit which consists of a standard safety switch 17, conductors 18 and 18', a control switch 21 of a control switch device 19, conductors 22 and 22', Variac 23, conductors 24 and 24', transformer 25, conductors 26 and 26', circuit breakers 27 and 27' and conductors 28 and 28' which are attached to the clips 15 and 15'. The control switch device 19 may, for example, be of the type known as a "Clark contactor" or any desired type of electromagnetic switch.

The circuit breakers 27 and 27' are connected in each side of the line, hence in series with the coil 13 and the secondary of the transformer 25. Since the circuit breakers 27 and 27' are identical, the operation of the circuit breaker 27 only will be described in detail. A solenoid coil 29 is connected in series with a latch-trip switch 30 which is spring biased to the open position. A trip lever 31 holds the switch in its normal closed position. When the current flowing through the solenoid 29 exceeds a predetermined level, the solenoid actuates the trip lever 31 permitting the switch to be opened by the biasing spring 32. The switch must be reset manually in order to again close the circuit. The solenoid coil 29 is connected in parallel with a rheostat 33 so that the proportion of the total current passing through the solenoid may be regulated. While only one circuit breaker will be sufficient to perform the safety function of the circuit, an additional safety factor is provided by including both circuit breakers, as illustrated.

The transformer 25 and the Variac 23 are provided so that the magnitude of current and voltage applied to the coil 13 may be adjusted to suit a particular application. It will be obvious that other means may be used for this purpose, such as transformer used singly, and the above means are shown and described only by way of illustration.

A lamp 34 is connected across the fusion current supply line to indicate when fusion current is flowing to the coil 13.

The contactor 19 provides the principal control for the fusion current supply circuit. In addition to the contactor control switch 21 shown as a double pole switch, the contactor consists of a two-point make switch 35 and a solenoid 37. Both the control switch 21 and the two-point make switch 35 are coupled to the solenoid 37 as shown schematically at 36 and are closed by the solenoid 37 in response to energization thereof.

A control circuit for energizing the solenoid 37 is connected across the contactor input terminals 20 and 20' for its energy supply, and may be traced as follows: Beginning with contactor terminal 20, through conductor 39, normally closed contacts 41 of a sensitive relay 40, a timing device 42, conductor 43, start-stop switch 44, conductors 45 and 46, two-point make switch 35, conductor 47, solenoid coil 37, and conductor 48, to input terminal 20'.

The function of the timing device is to control the time during which the solenoid 37 is energized; hence to control the time during which fusion current is flowing through the coil 13. The timing device 42 is shown, by way of example, as a means for accomplishing this function. This timing device comprises a spring loaded switch 51 which is biased to the closed position, a cam 53 for actuating the switch 51, a motor 55, such as a synchronous clock motor, for driving the cam 53 and a speed reduction mechanism 57 coupled between the motor 55 and the cam 53 provided for controlling the speed of rotation of the cam. The terminals of the motor 55 are connected in series with the switch 51.

At the beginning of a timer cycle, the timer will appear as illustrated in the drawing with the switch 51 being closed. When the control circuit is energized, the motor 55 will cause the cam 51 to rotate in a counter-clockwise direction. The motor will continue to drive the cam until the projection 54 on the surface of the cam 53 engages the switch 51 momentarily opening the circuit. The control circuit then becomes de-energized stopping the motor 55. The cam will continue to rotate, due to momentum, so that the projection 54 will become disengaged with the switch 51 permitting it to return to its original closed position and the timer is then ready for the next cycle.

A safety circuit is provided to protect the arbor from damage due to arcing between the coil 13 and the arbor 11 caused by defective or ruptured insulation on the coil 13. This circuit imposes a difference of direct current (D. C.) potential between the coil 13 and the arbor 11, which potential is provided by a battery 61. The safety circuit may be traced as follows: From the positive terminal of a battery 61 through conductor 63, arbor 11, coil 13, conductors 28 and 28', resistors 65 and 67, conductor 69, winding 71 of relay 40, and resistor 73 to the negative terminal of the battery 61.

While the D. C. source is shown as a battery 61, other sources of D. C. energy may be utilized with equal effectiveness. One of the important requirements of this safety circuit is that the current applied be small so that there will be no arcing between the coil and the arbor, or, if there is arcing, it will not damage the arbor because of the low value of current. Another important requirement of the safety circuit is that the relay 40 be very sensitive, that is, that it respond immediately to a small current flow.

In operation of the described illustrative embodiment under normal conditions, there is no current flowing in the safety circuit because an open circuit exists between the arbor 11 and the coil 13. Consequently the contacts 41 of the sensitive relay 40 are in their normal closed position. The control circuit may then be energized by depressing the start button switch 75 of the start-stop switch 46. This bridges the holding contacts of the switch 35 and energizes the coil 37 over the previously traced relay coil circuit. The timing device 43 will now operate as above described.

Energization of a solenoid coil 37, of course, causes the control switch 21 in the supply circuit and the two-point-make switch 35 in the control circuit to be closed. Fusion current will now flow to the coil 13 through the supply circuit.

When the start button switch 75 of the start-stop switch 44 is released, the control circuit will continue to be energized since the current will now flow from the timing device 42 through conductor 43, the stop button switch 77, conductor 46, the two-point make switch 35, and conductor 47 to the solenoid coil 37. The control circuit will remain energized until the switch 51 of the timing device 42 opens, at the conclusion of the fusion cycle. When the control circuit is then de-energized the switches 21 and 35 will be opened in response to the de-energization of the solenoid 37.

Since the coils which are wound on apparatus for which this protective system has been developed are generally made of copper wire, considerable current is required to heat the coil to a temperature sufficient to cause the insulation to bond. If the winding apparatus should wind a coil of too few turns or if a short should occur between turns of the coil, the coil will present a decreased resistance to fusion current flow. The resulting increase of current flowing through the coil may cause damage to the arbor due to overheating or due to a break down of wire insulation resulting in the grounding of the coil to the arbor. When this grounding occurs, the high fusion current causes severe arcing between the coil and the arbor resulting in serious pitting of the arbor surfaces. The circuit breakers 27 and 27' are placed in the supply circuit, therefore, to open this circuit when the fusion current exceeds a preset level.

If, during the fusion cycle, the coil should become grounded to the arbor, an additional measure of protection is provided by the safety circuit. The instant a ground occurs the safety circuit will close causing the relay 40 to open contacts 41 in the control circuit. Hence, the control circuit is immediately de-energized and the control switch 21 in the supply circuit cuts off the flow of fusion current to the coil 13. It is important that this cycle of events occur rapidly so that the flow of fusion current can be interrupted before serious arcing can take place between the coil and the arbor.

If the coil should become grounded to the arbor during the winding thereof, the safety circuit will energize the relay 40 as soon as it is connected to the coil 13 and will prevent the control circuit from being energized by the start button 48.

What is claimed is:

1. A protective system for a metallic coil winding arbor in which a coil wound thereon is adapted to be connected to a source of fusion current, said system comprising a fusion current supply circuit adapted to be connected across a coil, said circuit including a normally open contactor switch for controlling the flow of fusion current to said coil and circuit breaking means connected serially with said coil, a control circuit including electromagnetic means for actuating said contactor switch, said control circuit further including normally closed circuit interrupting contacts, a safety circuit operative independently of said supply circuit for providing a difference of electric potential between said coil and said arbor, and said safety circuit including a sensitive electromagnetic means for opening said circuit interrupting contacts and a power source of small magnitude for energizing said last named electromagnetic means.

2. A protective system for a metallic coil winding arbor in which a coil wound thereon is adapted to be connected to a source of fusion current, said system comprising a supply circuit for connecting said coil to a source of fusion current, said supply circuit having a normally open control switch and at least one circuit breaker connected in series with said coil, said circuit breaker acting to interrupt said supply circuit in response to an increase in current in said supply circuit above a predetermined level, a control circuit including electromagnetic means coupled to said control switch for actuating said control switch, said control circuit further including, in series with said electromagnetic means, the contacts of a sensitive relay, a safety circuit connected between said coil and said arbor for impressing a difference of potential therebetween, and said safety circuit including, serially, an electromagnetic winding for actuating said sensitive relay and a power supply of small magnitude for operating said sensitive relay.

3. A protective system for a metallic coil winding arbor in which a coil wound thereon is adapted to be connected to a power source for fusion current, said system comprising a contactor having a control switch actuated by an electromagnetic winding, means for regulating the current and voltage applied to said coil from said power source through said control switch, at least one circuit breaker electrically connected in series with said coil, said circuit breaker being responsive to an increase in the flow of current therein above a predetermined level to interrupt the flow of current to said coil, a control circuit for supplying electrical energy to said contactor electromagnetic winding, said control circuit comprising a timing device and circuit interrupting means connected in series with said contactor electromagnetic winding, a safety circuit for connecting a source of potential between said coil and said metallic coil arbor, and a sensitive solenoid connected in series with said last named source of potential for operating said circuit interrupting means and safety circuit being operative independently to pass a current of small magnitude sufficient to operate said circuit interrupting means.

4. A protective system for a metallic coil winding arbor in which a coil wound thereon is adapted to be connected to a source of fusion current, said system comprising a supply circuit for connecting said coil to a source of electrical energy, a contactor having switch means for energizing said supply circuit, means for actuating said contactor switch means, said supply circuit having circuit interrupting means connected in series with said coil, said circuit interrupting means being responsive to current increase above a predetermined level, a sensitive relay having normally closed contacts and means magnetically coupled thereto for actuating said contacts, a control circuit for energizing said contactor switch actuating means, said control circuit including said relay contacts, an auxiliary source of current for energizing said sensitive relay, and a safety circuit connecting said arbor and said coil in series with said current source and said relay contact actuating means.

5. A protective system for a metallic coil winding arbor in which a coil wound thereon is adapted to be connected to a source of fusion current, said system comprising a contactor having a control switch and an electromagnetic winding for actuating said control switch in response to energization of said winding, a supply circuit for connecting said coil to a source of electrical energy, said supply circuit including said contactor control switch, means for adjusting the current and voltage therein, at least one circuit breaker connected in series with said coil, said circuit breaker acting in response to an increase in current above a predetermined level, a sensitive relay having contacts normally biased to the closed position and an electromagnetic winding for opening said contacts in response to energization thereof, a control circuit connected to said contactor electromagnetic winding for energizing said winding, said control circuit including, in series with said last named winding, a timing device, a switch for energizing said control circuit and said contacts of said sensitive relay, and a safety circuit operative independently of said supply circuit for impressing a source of small potential between said arbor and said coil, said safety circuit including, in series with said arbor and said coil, said electromagnetic winding of said sensitive relay, and means limiting the current flow in said safety circuit to a small value sufficient to actuate said sensitive relay.

6. A protective system for a metallic coil winding arbor wherein a coil wound thereon is connected to a source of fusion current, said system comprising a supply circuit adapted to be connected across a coil, a normally open, electromagnetically operated switch connecting said supply circuit to a source of fusion current, means for regulating the current and voltage passing through said supply circuit including circuit braking means connected in series with said coil, a control circuit including a manually operable switch means for actuating said electromagnetically operated switch in said supply circuit, a sensitive relay having normally closed contacts connected in series in said control circuit, a power supply for producing a small current sufficient to operate said senstive relay, and a safety circuit including said power supply and said sensitive relay in series, said safety circuit being connected between said arbor and said supply circuit to open said control circuit when said coil is grounded to said arbor.

7. A protective system for a metallic coil winding arbor wherein a fusion current is passed through a coil wound thereon, a supply circuit adapted to be connected across a coil wound on said arbor, a normally open electromagetically operated switch connecting said supply circuit to a power source, means in said supply circuit for regulating the current and voltage applied through said circuit, circuit braking means in said supply circuit responsive to the magnetiude of current in said circuit, a control circuit for actuating said electromagnetically operated switch in said supply circuit including manually operable switch means and a timing device, a sensitive relay having normally closed contacts which are serially connected in said control circuit, an auxiliary power supply of small magnitude for providing current sufficient to operate said sensitive relay, a safety circuit including said sensitive relay and said power supply in series and connected between said arbor and said supply circuit, said safety circuit opening said control circuit in response to a closed circuit between said supply circuit and said arbor.

References Cited in the file of this patent

UNITED STATES PATENTS

| 1,206,157 | Steen | Nov. 28, 1916 |
| 1,324,903 | Klink | Dec. 16, 1919 |
| 2,321,103 | Robinson | June 8, 1943 |
| 2,535,064 | Harrison | Dec. 26, 1950 |
| 2,637,843 | Kammerdiener | May 5, 1953 |

FOREIGN PATENTS

| 596,044 | Germany | Apr. 26, 1934 |

OTHER REFERENCES

Harrison: Abstract of application, Serial Number 170,439, published Sept. 29, 1953, 370 O. G. 357.